May 28, 1940. C. SIEGFRIED 2,202,030
APPARATUS FOR MAKING SLIVERS OR THE LIKE
Filed March 8, 1938 2 Sheets-Sheet 1

Claus Siegfried
INVENTOR.

BY Rule & Hoge
ATTORNEYS.

May 28, 1940.   C. SIEGFRIED   2,202,030
APPARATUS FOR MAKING SLIVERS OR THE LIKE
Filed March 8, 1938   2 Sheets-Sheet 2

Claus Siegfried
INVENTOR.

BY Rule & Hoge,
ATTORNEYS.

UNITED STATES PATENT OFFICE 2,202,030

APPARATUS FOR MAKING SLIVERS OR THE LIKE

Claus Siegfried, Dusseldorf, Germany, assignor, by mesne assignments, to Owens-Corning Fiberglas Corporation, a corporation of Delaware Application March 8, 1938, Serial No. 194,622
In Germany March 18, 1937

3 Claims. (Cl. 19—150)

My invention relates to apparatus for use in the manufacture of strands or slivers used in textiles, and particularly to mechanism of the type in which a multiplicity of fine fibers are produced and combined to form a thread or sliver by a continuous process. The fibers may consist of glass or like material and are formed by simultaneously flowing a multiplicity of small streams of the molten material and attenuating them to fine fibers by a blowing process. The fibers as they are produced are projected onto a rapidly moving support on which they accumulate in the form of a mat or web which is continuously drawn from the support and given the form of a strand or sliver.

Heretofore in practicing the above process it has been customary to employ a continuously traveling endless belt conveyor running over supporting and driving rolls, as the moving support on which the fibers as they are formed are projected and from which they are drawn in sliver formation as shown, for example, in the French Patent No. 814,149. An endless belt conveyor used in this manner is open to various objections. Difficulty is encountered in maintaining such a support in good working order. There is a tendency for looseness to develop in the conveyor, requiring frequent adjustments which interfere with the continuous and smooth operation. Difficulty is sometimes experienced on account of the fibers becoming entangled in the conveyor, and working into the bearings and between the conveyor and the supporting rolls. Moreover, the belt requires considerable ancillary apparatus such as supports, drums, and the like, which are expensive and tend to wear out rapidly.

An object of the present invention is to overcome these and other objections incident to conventional apparatus and to provide an improved form of moving support to receive the fibers as they are produced and from which support they are drawn in the process of forming sliver.

Other objects of the invention will appear hereinafter.

Referring to the accompanying drawings.

Figure 1:
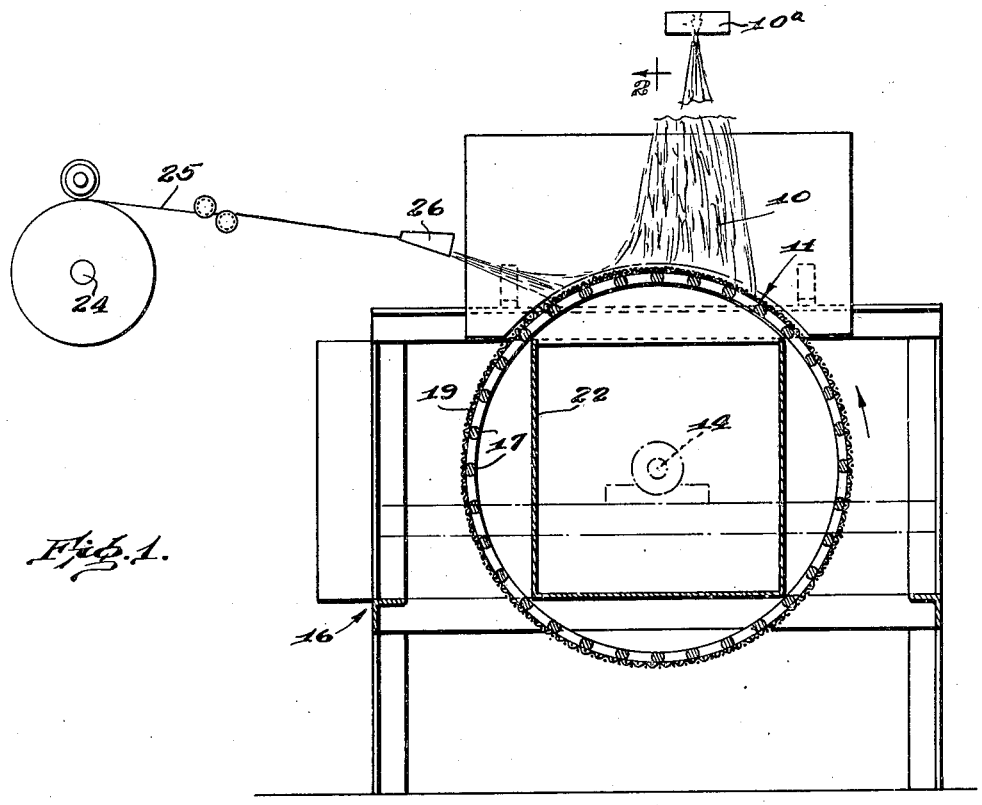
Fig. 1 is a sectional elevation of an apparatus constructed in accordance with my invention, the rotary support being in the form of a drum.
Figure 2:
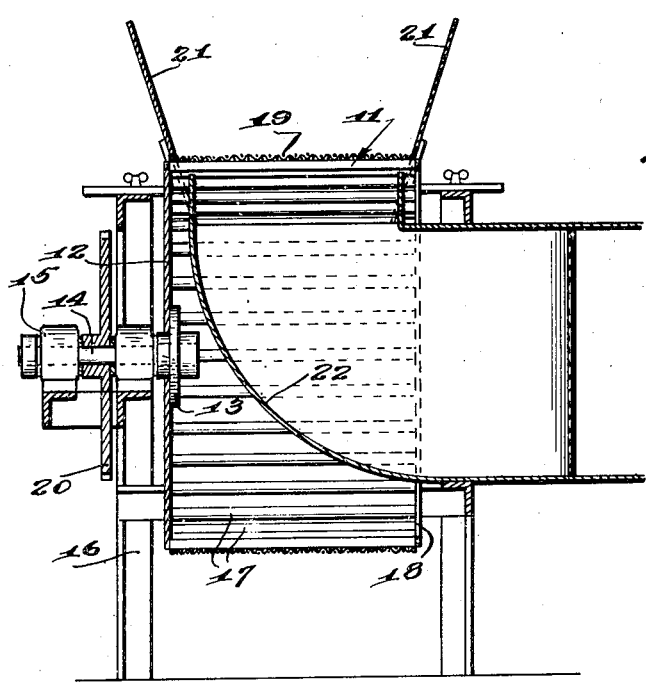
Fig. 2 is a sectional elevation of the same at the line 2—2 on Fig. 1.

Referring particularly to Figs. 1 and 2, a multiplicity of fine fibers 10 which may consist of glass or similar material, are produced by continuously flowing a multiplicity of small streams of the material from a supply body (not shown) and passing said streams through a blower 10ª which may be conventional. Steam or other gas under pressure is supplied to the blower and operates on the streams of molten glass to draw and attenuate them into the form of fine fibers 10.

The fibers as they are thus formed are carried downwardly and accumulate in matted or web formation on the peripheral surface of a continuously rotating support 11 which is shown in Figs. 1 and 2 as in the form of a squirrel cage or drum. The drum comprises a rigid disk 12 forming a head thereof which is rigidly secured by means of a hub 13 to a horizontal shaft 14 journaled in bearings 15 on a supporting frame 16. The drum is of squirrel cage construction, the peripheral portion of the drum comprising horizontal bars 17 spaced at short intervals throughout the circumference of the drum. Each of these bars is fixed at one end to the head 12 and at its opposite end to a ring 18, thereby leaving the drum open at the end opposite the head 12. Overlying the bars 17 is a cover 19 of openwork or reticulated construction providing a porous supporting surface on which the fibers as they are formed are projected and momentarily held. The support 19 may consist of open mesh woven wire fabric or other suitable porous structure and is preferably of a construction to provide a rough surface to effectively hold the accumulated fibers while they are being drawn from the rotating drum.

The drum is continuously rotated by a motor (not shown) having a driving connection with the drum through a gear 20 attached to the drum shaft. Shields 21 are mounted on the frame 16 to extend upwardly above the drum on opposite sides of the path of the fibers.

Within the drum is a suction box 22 open at its upper end which is located directly beneath the zone of accumulation of the fibers on the drum. Air is continually exhausted from the suction box by a fan or pump (not shown), thereby maintaining a continuous down-draft of air or gas through the support 19.

In operation, the fibers as they are formed and deposited upon the periphery of the drum, continuously accumulate thereon in the form of a thin mat or web which as it is formed, is drawn off the drum and given the form of a sliver or strand. The sliver is drawn by and wound upon a spool, drum or other suitable holder 24 which is rotated continuously. The fibers as they are projected onto the surface 19 form a thin mat or web on that portion of the drum surface which is positioned over the open upper end of the suction box. This mat of fibers is directed from the surface of the drum to and through a trumpet or other guide 26 by which the web is condensed or constricted to form a sliver 25. The peripheral speed of the winding drum or spool 24 is preferably much greater than that of the drum 11.

Figure 3:
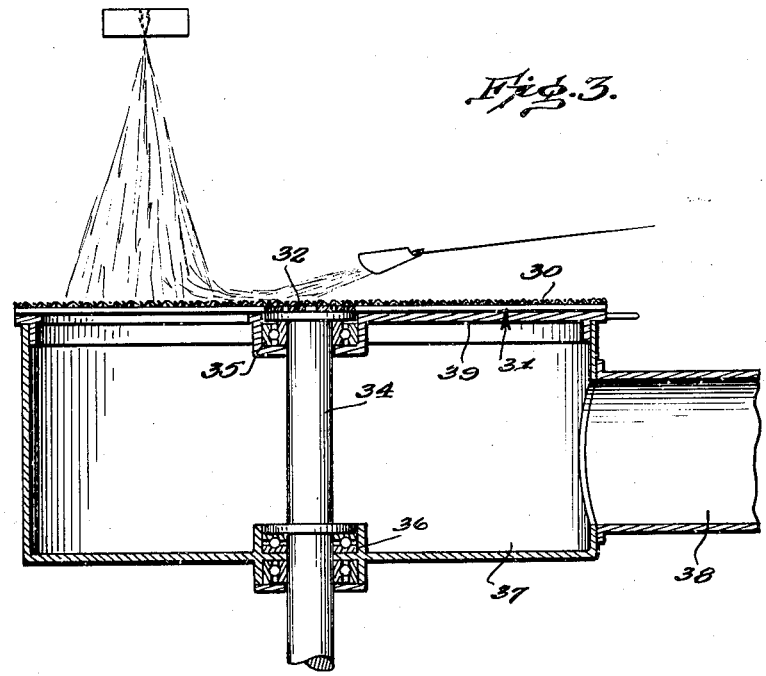
Fig. 3 is a sectional elevation of a modified construction in which the foraminous support is in the form of a rotating table or disk.
Figure 4:
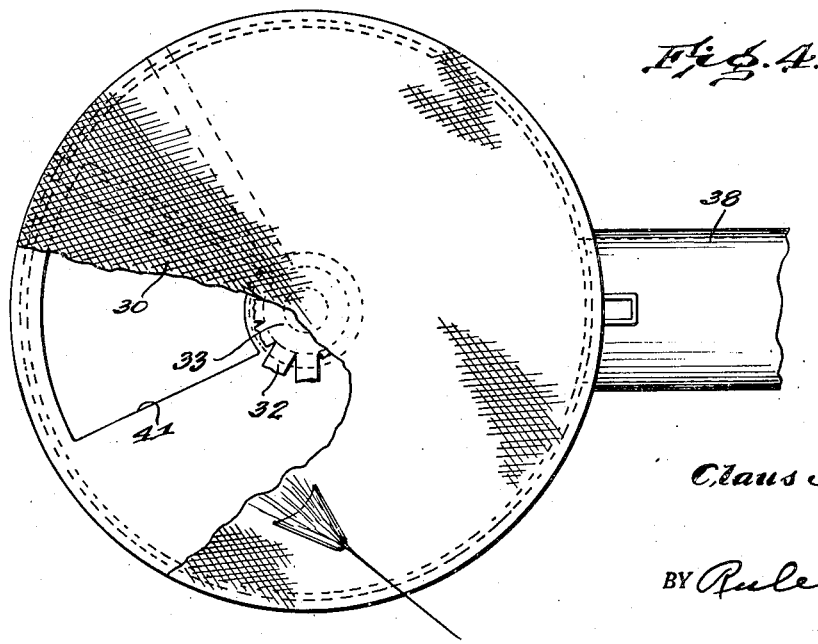
Fig. 4 is a top plan view of the same, parts being broken away.

Figs. 3 and 4 illustrate a modification in which a rotary disk or table 30 provides a support for the fibers in place of the cylindrical surface 19 shown in Figs. 1 and 2. The support 30 is made of open wire mesh or other openwork material which may be the same as described in connection with the surface 19. This table 30 which is circular in form is supported on a horizontally disposed spider 31 comprising an annular series of radial arms 32 radiating from a hub 33 fixed to the upper end of a vertical shaft 34 which is continuously rotated. The shaft 34 is journaled in bearings 35 and 36 in the upper and lower heads of a stationary cylindrical box or case 37 which serves as a support for the shaft and rotating table and also as a vacuum chamber or suction box.

Suction or subatmospheric pressure is maintained within the box or drum 37 by continuously exhausting the air therefrom through a conduit 38 extending to a suction pump or fan. The upper head of the drum 37 is in the form of a disk 39 which seats on the upper peripheral surface of the drum and is rotatively adjustable thereon. The plate 39 is provided with a segmental opening 41 therein through which the air or gases are drawn for more firmly holding or anchoring the fibers while supported on the table 30. By adjustably rotating the disk 39 the opening 41 can be shifted laterally to any desired position required for obtaining the desired holding effect on the accumulating fibers.

It should be noted that as the fibers are deposited upon the supporting surface (19 or 30) they extend more or less promiscuously in all directions parallel with the supporting surface and are more or less intertwined or matted. As the web or mat is drawn from the supporting surface the fibers are brought into approximate parallelism to form a sliver and the latter is drawn out or attenuated to an extent depending on the peripheral speed of the winding spool or the package of wound sliver.

Modifications may be resorted to within the spirit and scope of my invention.

I claim:

1. In an apparatus for forming strands or slivers, the combination of a disk, means for continuously rotating said disk about a stationary axis, said disk consisting of openwork material permitting free passage of air therethrough, means for continuously projecting onto said disk a shower of fibers and causing them to form a web on the disk, and means for continuously drawing the web from the surface of the disk giving said web the form of a sliver.

2. In an apparatus for forming strands or slivers, the combination of a disk, means for continuously rotating said disk about a stationary axis, said disk consisting of openwork material permitting free passage of air therethrough, means for continuously projecting onto said disk a shower of fibers and causing them to form a web on the disk, means for continuously drawing the web from the surface of the disk giving said web the form of a sliver, and a stationary suction box beneath said disk and provided with an opening directly beneath and coextensive laterally with a predetermined area of fiber accumulation on said rotating table, whereby a down-draft is maintained through said table into the suction box and a holding force applied to the fibers deposited on said table.

3. An apparatus for forming strands or slivers, comprising the combination of a vertical shaft, a horizontal disk concentric with and attached to the upper end of the shaft for rotation therewith, said disk providing an openwork surface, means for continuously projecting a shower of fibers onto said disk at one side of the axis thereof, a drum-shaped box beneath said disk and substantially coextensive laterally therewith, the upper surface of said box being provided with an opening beneath that portion of the disk on which the fibers are deposited, whereby a down-draft of air or gas through the disk is maintained and the fibers held with a predetermined force, and means for continuously drawing the accumulated fibers off said disk and forming them into a strand or sliver.

CLAUS SIEGFRIED.